United States Patent [19]

Mallinson

[11] Patent Number: 4,597,632

[45] Date of Patent: Jul. 1, 1986

[54] TEMPERATURE SENSITIVE RELEASABLE OPTICAL CONNECTOR

[75] Inventor: Stephen R. Mallinson, Ipswich, England

[73] Assignee: British Telecommunications, London, England

[21] Appl. No.: 555,077

[22] Filed: Nov. 25, 1983

[30] Foreign Application Priority Data

Nov. 26, 1982 [GB] United Kingdom ............... 8233761

[51] Int. Cl.$^4$ ............................................. G02B 6/38
[52] U.S. Cl. ............................................. 350/96.21
[58] Field of Search ............... 350/96.20, 96.21, 96.22; 403/273

[56] References Cited

U.S. PATENT DOCUMENTS

| | | | |
|---|---|---|---|
| 3,914,015 | 10/1975 | McCartney | 350/96.22 |
| 4,261,644 | 4/1981 | Giannaris | 350/96.21 |
| 4,352,542 | 10/1982 | Tydings | 350/96.21 |

FOREIGN PATENT DOCUMENTS

| | | | |
|---|---|---|---|
| 0004696 | 10/1979 | European Pat. Off. | |
| 0052014 | 5/1982 | European Pat. Off. | |
| 1488393 | 10/1977 | United Kingdom | |
| 1524751 | 9/1978 | United Kingdom | 350/96.21 |
| 1555475 | 11/1979 | United Kingdom | |
| 2025084 | 1/1980 | United Kingdom | |
| 1580061 | 11/1980 | United Kingdom | 350/96.21 |

OTHER PUBLICATIONS

Goldstein et al, "A Connector-Like Device for Joining Optical Fibers", 12th *Annual Connector Symp. Proc.* (Cherry Hill, N.J.), Oct. 1979, pp. 214–220.

Machine Design, vol. 52, No. 1, Jan. 1980, Cleveland Ohio (US), "Scanning the Field for Ideas:-Memory Metal Couples Optic Fibers", p. 50.

Patents Abstracts of Japan, vol. 6, No. 241, Nov. 30, 1982, p. P158 & JP-A 57 139 714 (Nippon Denshin Denwa Kosha) (28-08-1982).

Patents Abstracts of Japan, vol. 1, No. 35, Section E, Apr. 15, 1977, p. 1994E76, & JP-A-51 133 036 (Furukawa Denki Kogyo K.K.) (18-11-1976).

"Shape-Memory Alloys", by Schetky, *Scientific American*, Nov. 1979, pp. 68–76.

*Primary Examiner*—John Lee
*Attorney, Agent, or Firm*—Nixon & Vanderhye

[57] ABSTRACT

An optical fibre connector to connect two optical fibres comprises a ferrule secured to each fibre end, and a clamping sleeve of shape memory effect metal to align and clamp the ferrules. The shape memory effect metal is selected and trained to expand on heating above its transformation temperature. The bore of the clamping sleeve is arranged to make an interference fit with the ferrules when below the transformation temperature, and a clearance fit when above the transformation temperature. An elastic titanium alloy compression sleeve surrounding the clamping sleeve provides for long-term integrity of the connector and reinforces the clamping action of the clamping sleeve when below its transformation temperature.

21 Claims, 2 Drawing Figures

TEMPERATURE SENSITIVE RELEASABLE OPTICAL CONNECTOR

This invention relates to connectors, and in particular though not exclusively to optical fibre connectors.

Optical communications technology, that is to say the technology concerned with optical fibres, optical sources, optical detectors, and other devices and components for gathering, transmitting or processing information optically, has evolved rapidly in recent years and is being widely adopted in fields such as for example, telecommunications, data processing, and measuring and sensing.

One of the major problem areas in the practical implementation of the optical communications technology has proved to be the need for making connections. Such connections may need to be of a permanent kind, fusion splicing of optical fibres is an example, but frequently need to be such that connections can be made or broken as and when required. The design of practical connectors has, however, met with appreciable difficulties.

These difficulties stem primarily from the uncommonly small dimensions which have to be catered for. Thus, the outside diameters of optical fibres are usually less than a few hundred micrometers, typically in the range of 100 μm or less, to 300 μm, and their core regions have currently diameters of between 50 μm and 150 μm in the case of multimode fibres, and between 5 μm and 10 μm in the case of monomode fibres. In order to avoid unacceptably high losses, an optical fibre connector must ensure very accurate optical alignment of the adjoining fibre ends it connects, a problem which is especially acute in relation to monomode fibres. The alignment needs not only to be achieved initially on connection, but must be maintainable over extended periods, ideally even in the presence of mechanical vibration and shocks. Also, the same degree of alignment must be achievable on each subsequent re-connection. In addition to the constraints imposed by the requirement for acceptably low losses, a practically useful connector should also provide ease of handling and the operation of making and breaking the connection should generally be as simple as possible.

Some of the aforementioned problems are discussed, for example, by Haruhiko Tsuchiya et al in "Single Mode Fibre Connectors", Review of the Electrical Communications Laboratories, Vol 27, Nos. 7–8, July-August 1979, pp 543–554. The article also proposes a connector design in which alignment is achieved by an elaborate centering arrangement involving steel ball bearings. The person familiar with the art will be aware of many other connector designs, for example using V-grooves or conical alignment arrangements, which have in the past been proposed.

As mentioned earlier, connections between optical fibres may also be of a permanent kind, that is by splicing the adjoining ends of the fibres. A modification of the splicing technique, which permits repeated connection and disconnection is proposed in U.S. Pat. No. 4,352,542 (John E Tydings) in which a permanent splice is replaced by aligning and clamping adjoining optical fibre ends by means of three opposing bent strips of a shape memory alloy, Nitinol, inserted in a tube of berylium copper. The strips try to straighten into their "remembered" original shape when the device is heated through the transition temperature of the shape memory effect alloy. This straightening results in increase of the size of the axial cavity formed by the opposing strips, and causes the tube to be deformed into a convex-sided triangle whose vertices lie along the lines at which neighbouring strips meet. The optical fibre ends are inserted into the expanded cavity. On cooling, the elastic energy stored in the deformed tube returns the strips once again into their bent shape and the optical fibre is gripped along the tangential lines of contact with the bent strips. The same splice-connector is described briefly also in "903 Machine Design", Vol 52 (1980) Jan, No. 1, Ohio, page 50.

Other forms of splice-connectors in which the ends of two optical fibres are aligned by applying to the fibre ends the pressure resulting from a change in shape of a shape memory effect alloy are disclosed in GB Pat. No. 1555475 (The Plessey Company Limited), and in U.S. Pat. No. 4,261,644 (R J Gianneris), in which the pressure results from contractions of a shape memory alloy sleeve.

One of the major shortcomings affecting the splice connectors disclosed in U.S. Pat. No. 4,352,542, GB No. 1555475, and U.S. Pat. No. 4,261,644 is the need to thread optical fibres of merely a few hundred micrometers diameter into apertures of similarly small dimensions. To overcome this, GB No. 1555475 proposes to interpose, between the shape memory effect sleeve and the fibre, clamping segments separated by elastic spacers. The elastic spacers are compressed on contraction of the shape memory effect metal sleeve and hence permit the clamping segments to grip the optical fibres. In contrast, U.S. Pat. No. 4,261,644 proposes a variant in which the optical fibre ends are enclosed in separate shape memory effect tubes which are then mounted in conventional type screw connector components, the problem having thus been transferred to ensuring the required alignment accuracy between the adjoining shape memory effect tubes. Threading the fibre ends into the sleeve is not quite so severe a problem in the case of U.S. Pat. No. 4,352,542 since the aperture is considerably larger. Instead, there are clearly handling difficulties in ensuring that the fibre ends are properly located, within the larger cavity, relative to each other and with respect to the bends of the strips. Moreeover, because of the pronounced change in shape of the outer tube, its attachment to equipment wall panels and the like is problematic.

It is an object of the present invention to provide a connector for use in optical systems which overcomes or at least mitigates some of the aforementioned problems when used for connecting optical fibres, and which is adaptable to uses in optical systems other than connecting optical fibres.

According to the present invention, an optical connector comprises a plug member having a plug portion and arranged to permit mounting of one or more service components in a desired position relative to the plug portion, and a socket member including a cavity, a socket portion of which cavity includes an inner clamping member of shape memory effect (SME) material having a socket portion therein dimensioned to provide releasable engagement with said plug portion by means of thermally induced shape change of the shape memory effect material clamping member. The SME clamping member is arranged to grip the plug portion in a first temperature range and to release the plug portion in a second temperature range, the SME material being in its softer phase in said first temperature range and in its harder phase in said second temperature range. An outer compression member of elastic material is arranged to reinforce contraction of the clamping member in the first temperature range and to be elastically deformed by expansion of the clamping member in the second temperature range. In the case of optical systems, the service components will often be optical components such as, for example, optical fibres or lenses.

The transformation temperature of the shape memory effect material may be either higher than the highest, or lower than the lowest, temperature to which the connector is normally exposed under service conditions.

Shape memory effect metal may be treated and trained to expand either on heating through its transformation temperature, or on cooling through the transformation temperature. Accordingly, the first temperature range may be either above or below the second temperature range.

Thus, the clamping member may comprise shape memory effect metal having a transformation temperature below the minimum temperature likely to be experienced in service. In this first case, in order to assemble or disassemble the coupling, the clamping member is cooled to a temperature below its transformation temperature until the socket portion of the cavity is sufficiently expanded to make a clearance fit with the plug portion to permit insertion or withdrawal thereof. On heating to a temperature within the normal service range the socket portion contracts which results in the plug portion being gripped by shape memory induced stresses within the clamping member. To release the plug portion the clamping member must once again be cooled to below its transformation temperature.

Alternatively, and preferably, the transformation temperature value of the shape memory effect metal is chosen to be above the maximum temperature that will be experienced in service. In this case, to assemble the coupling, the clamping member is heated above the transformation temperature until the socket portion is sufficiently expanded to make a clearance fit with the plug portion. On cooling below the transformation temperature the socket portion contracts to make an interference fit with the plug portion. In order to disassemble the coupling the clamping member has to be heated once again above its transformation temperature.

In either of the aforementioned cases, assembly and disassembly can be repeated a large number of times. Means for heating or cooling the clamping member may be incorporated in the socket member.

Using the preferred form of clamping member, with a transformation temperature above the service temperature, the clamping member is in its low hardness condition at normal service temperature, and in order to achieve a satisfactory long-term coupling the clamping member is preferably enclosed in a compression member which provides rigidity and, furthermore, improves the clamping action of the clamping member.

Preferably the clamping member comprises an inner sleeve of shape memory metal constituted and trained to expand on being heated through its transformation temperature. An outer sleeve, or compression member, of elastic material is arranged to be elastically deformed by said expansion and to aid contraction of the inner sleeve on cooling through the martensite transformation temperature of the inner sleeve.

The plug member is conveniently an optical fibre termination member.

The clamping member may conveniently take the form of a sleeve of shape memory effect metal arranged to be fitted over, and keep in alignment, two abutting plug portions.

The plug members each may be a cylindrical ferrule, affixed to a fibre end, with the fibre end lying in the plane of the abutment end face of the ferrule.

Alternatively, the ferrule may comprise or include lens arrangements, for example rod lenses, to relax the offset alignment requirements.

It should be observed that, since the transformation temperature is readily selectable, the plug member may itself comprise shape memory effect material to facilitate ease of mounting of the aforementioned service components. It may, for example comprise a clamping member of the aforementioned kind comprising a sleeve of shape memory effect metal enclosed in an outer sleeve of elastic material. This outer sleeve may also conveniently provide the plug portion of the plug member. In this case the transformation temperature of the plug members would be chosen to differ sufficiently from that of the clamping member to prevent accidental loosening of the plug components when engaging or disengaging the plug member from the socket member.

The shape memory effect material is preferably a shape memory alloy containing Cu, Al and Zn wherein the ratio of Al to Zn+Cu+Al is 0.035 to 0.1, the ratio of Zn to Zn+Cu+Al is 0.09 to 0.28, and the ratio of Cu to Zn+Cu+Al is 0.65 to 0.825.

The invention will now be explained further by way of example and reference to the accompanying drawings of which:

Figure 1:
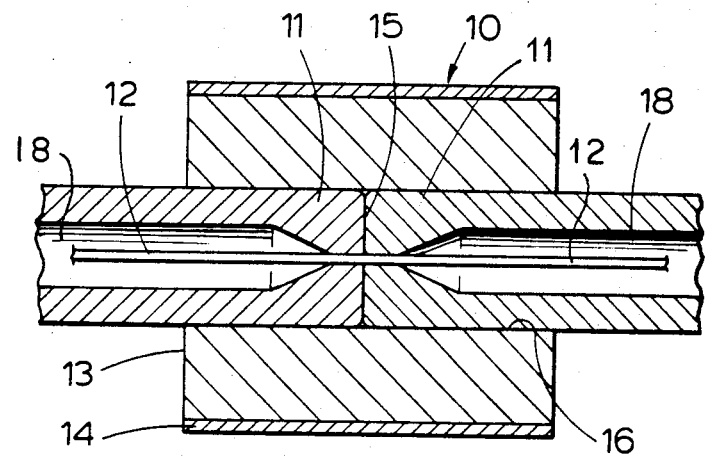
FIG. 1 is an enlarged cross-section of an optical fibre connector.

Referring first to FIG. 1 there is shown an optical fibre connector comprising two plugs 11, and a socket 10. The plugs 11 are cylindrical brass ferrules, and mounted concentrically within each ferrule 11 is an optical fibre end 12 extending to the end face 15 of the respective ferrule. Each ferrule has a polished plane and perpendicular end face 15 to reduce, as far as possible, the separation between the adjoining fibre ends.

The socket 10 is of cylindrical cross-section and comprises a clamping member consisting of an inner sleeve 13 of shape memory effect metal which is surrounded by an outer sleeve or collar 14 of high elastic strain metal. The inner sleeve 13 has a cylindrical through bore, or cavity, 16 to accommodate the ferrules 11.

The shape memory effect metal is a copper zinc aluminum alloy having the following approximate proportions by weight:-

| | |
|---|---|
| Copper | 70% |
| Zinc | 26% |
| Aluminum | 4% |

The material is formed into the inner clamping sleeve 13 and is heat treated and trained to expand on heating above its transformation temperature $T_z$ against the restraint of the compression collar 14. On cooling back towards and below $T_z$ the shape memory effect (SME) inner sleeve 13 returns to its contracted size and thereby permits the collar to contract in diameter. The transformation temperature $T_z$ would normally be chosen to lie above the highest temperature expected in service. The change in the diameters of the SME metal sleeve 13 and the collar 14 are governed by the conditions of force equilibrium and compatibility between the contacting surfaces at all temperatures.

Thus at high temperatures above $T_z$, the expansion is relatively large and this produces the highest stress condition in the SME sleeve 13 and collar 14. If unconstrained by a ferrule or other relatively solid object in the bore 16 of the SME sleeve 13, the stress in the collar 14 and the SME sleeve 13 reduces to zero as the temperature of the shape memory effect metal drops below the transformation temperature $T_z$. This would be the normal storage condition for the socket 10.

The bore 16 in the centre of the SME sleeve 13 is dimensioned so that at some temperature increment, for example 15° C., above the transformation temperature $T_z$ its diameter has increased sufficiently to permit insertion of the ferrule 11, or some other solid object on to which the sleeve 13 is required to clamp. On cooling back towards $T_z$ the reduction in diameter of the bore 16 in the SME sleeve 13 results in an interference stress being generated between each ferrule 11 and the bore wall of the SME sleeve 13 and this provides the required clamping action.

The presence of the elastic collar 14 does not by itself cause, but backs up, the natural clamping action generated by the shape memory induced stresses in the SME sleeve 13 and assists in maintaining the integrity of the joint over long service periods. Removal of the ferrules is easily accomplished by re-heating the socket 10 above the transformation temperature $T_z$.

Experiments were made, and satisfactory coupling of optical fibres achieved, with a coupling design having the following dimensions:-

| Collar | |
| --- | --- |
| O/D before assembly to ferrule | 9.05 mm |
| I/D before assembly to ferrule | 8.06 mm |
| Length | 30.00 mm |
| Material Ti, 3% Al, 2.5% V | |
| Shape memory effect sleeve | |
| O/D before assembly to collar | 8.65 mm |
| I/D after assembly to collar at $T < T_z$ | 4.50 mm |
| I/D of SME sleeve after assembly to collar at $T = T_z + 30°$ | 4.54 mm |
| Length of the SME sleeve | 30.00 mm |

The transformation temperature $T_z$ of the shape memory effect metal was chosen to lie at approximately 70° C.

The ferrules 11 have been made of ordinary brass with an axial bore 18 into which the optical fibre 12 is fitted and secured by epoxy resin or a similar hard setting, preferably adhesive substance, and are thereafter precision machined for concentricity with the optical fibre core to an outer diameter of 4.5 mm.

One advantage of the present optical fibre connector is the relaxation on diameter matching of the ferrules which it permits, since the memory metal sleeve 13 is capable of adapting to minor diameter variations between the two ferrules without adversely affecting the alignment of the optical fibres 12, provided the ferrule and fibre are concentric. In known connectors using ferrules, for example split-ring or V-groove connectors, not only had concentricity to be achieved between the cylindrical outer surface of the ferrule and the optical fibre core, but also the diameters of the ferrules had to be matched more accurately.

Figure 2:
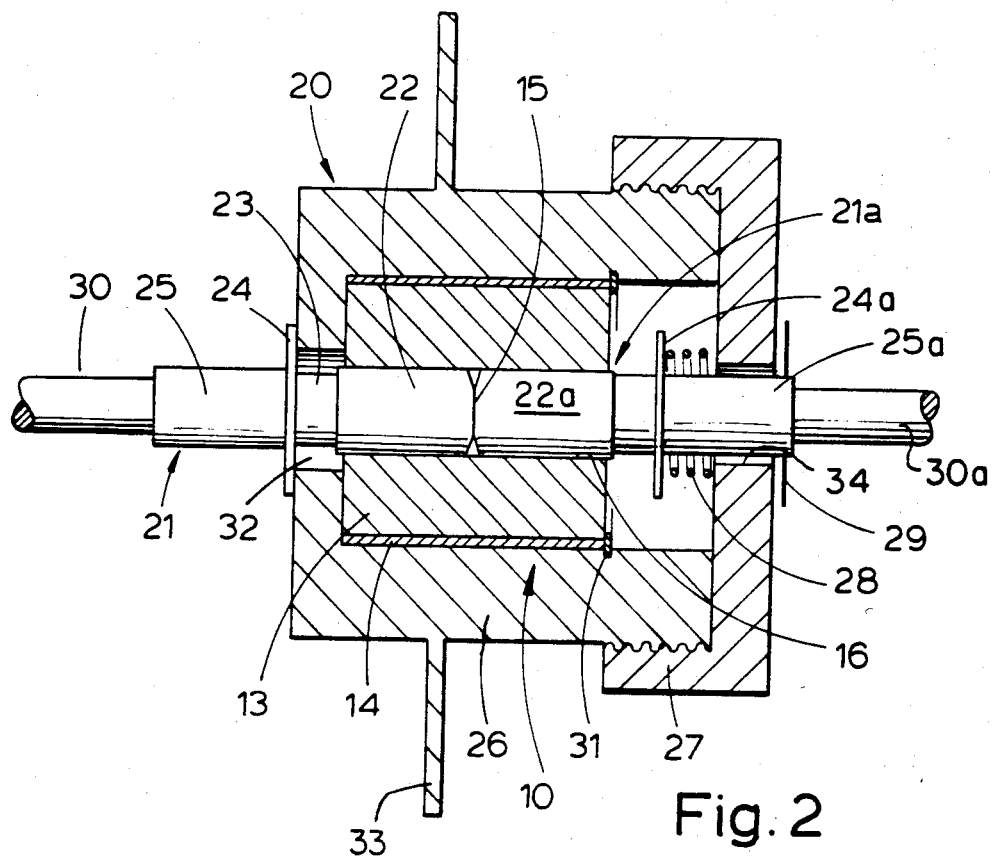
FIG. 2 is a schematic cross-section through a modified version of the fibre connector of FIG. 1.

FIG. 2 shows the connector 10 of FIG. 1 mounted within a housing assembly 20.

The housing 26 is generally cup shaped and has an external thread at the open end of the cup while the closed end of the cup is traversed by an axial bore 32 of an internal diameter which is larger than the outer diameter of the plug portion 22 of the ferrule 21, but which is less than the outer diameter of the flange 24. An internally threaded end cap 27 is arranged to be screwed on to the open end of the housing 26. The end cap 27 has a concentric central bore 34 through which passes the rear end 25a of the ferrule 21a. A compression spring 28 interposed between the inner face of the end cap 27 and the flange 24a on the ferrule 21a provides a bias which, when the end cap is secured to the housing 26, urges the ferrule into the bore 16 of the SME sleeve 13. The travel of the ferrule 21a in that direction is limited by a spring clip 29 mounted on the ferrule externally of the end cap 27.

Each of the ferrules 21, 21a comprises a precision machined forward plug portion 22, 22a which fulfills the same function, and is machined to the same tolerances, as the ferrules 11 of FIG. 1. Adjoining the precision machined plug portion 22 of the forward end is a middle section 23 which has an outer diameter slightly less than the plug portion 22 and which terminates in an annular flange 24. The rear section 25 of the ferrule is machined to a diameter approximately equal to that of the middle section 23. The outer sheathing of the optical fibre cable 30 terminates at or within the rear section of the ferrule 21, while the optical fibre (not shown) extends to the end face 15 of the ferrule 21 (as shown in FIG. 1 for ferrule 11).

Assembly of the coupling of FIG. 2 proceeds as in relation to FIG. 1, except in that the ferrules are inserted successively instead of together. The housing and clamping sleeve are heated sufficiently for the SME sleeve 13 to expand sufficiently for the plug portion 22a of the ferrule 21a to make a clearance fit with the bore 16. With the ferrule 21a inserted, the end cap 27 is screwed onto the open end of the housing 26. This causes the spring 28 to spring bias the ferrule 21a towards the bore 16. Subsequently, the left-hand ferrule 21 is inserted into the heated or reheated SME sleeve 13, and is pushed into the bore 16 until the flange abuts against the outer surface of the housing 26 thereby displacing the spring biased ferrule 21a slightly towards the end cap 27.

The clamping and compression sleeve assembly is secured within the large bore section of the housing by a slight interference fit, but to guard against movement of the assembly towards the end cap 27, a split ring 31 may optionally be provided.

The flange 33 on the housing 26 may be used, for example, to wall mount the housing of 26 and so constitute a bulkhead mounting, with the fibre 30, ferrule 21, representing the routinely demountable part of the connector.

The main advantage of the connector assembly of FIG. 2 over that of FIG. 1 is that the spring bias on the ferrule 21a obviates the need to maintain both ferrules manually in position until the clamping sleeve has sufficiently cooled to clamp the ferrules.

The possibility is envisaged of replacing the titanium alloy sleeve 14 with, for example, a stainless steel alloy of suitable elasticity.

The advantages of the preferred form of the connector, i.e. requiring heating to enable assembly or disassembly, over the alternative form requiring cooling, are:
1. To heat the sleeve to, say, 90° or 100° C. is generally easier than to cool the sleeve to, say, −50° C.
2. Under normal service conditions the SME material is below its transformation temperature and, hence, in its soft martensitic phase, rather than its harder austenitic condition (which, in the preferred form, enables the elastic deformation of the compression sleeve during expansion). The effect is that minor discontinuities in or between the ferrule surfaces are less likely to cause undesirable stress concentrations on the ferrules.
3. The SME characteristic is only required to act during assembly and disassembly, so that a longer service life can be expected.
4. The clamping stresses can be maintained with comparatively close tolerances and little loss, if any, of clamping pressure with time. The SME alloy for the clamping sleeves, and the prepared sleeves, used for the experiments were obtained from Delta Memory Metal of Ipswich.

As an alternative to providing a socket member incorporating a shape memory effect material, the shape memory effect material may form part of the plug member.

Applications of the invention other than connecting optical fibres will come readily to mind.

The connector hereinbefore described may be adapted, for example, to connection of a laser light source, which may be attached to the plug member or the socket member to an optical fibre transmission line.

The connector can also readily be adapted to provide mounting positions for optical components in general relative to other components.

Further advantages result from a suitable choice of connector design according to the invention in that the mating of a cylindrical plug portion and cylindrical socket portion provides a hermetic seal on contraction of the latter. It may thus be used to provide sealed cavities for lasers and the like.

I claim:
1. An optical connector comprising:
a plug member having a plug portion and arranged to permit mounting of one or more optical components in a desired position relative to the plug portion; and
(b) a socket member including
(i) an inner clamping sleeve of shape memory effect (SME) material having a socket portion therein dimensioned to provide releasable engagement with the plug portion and arranged to grip the plug portion in a first temperature range and to release the plug portion in a second temperature range,
wherein the SME material is in its softer phase in said first temperature range and in its harder phase in said second temperature range; and
(ii) an outer compression sleeve of elastic material arranged to reinforce contraction of the clamping sleeve in said first temperature range and to be elastically deformed by expansion of the clamping sleeve in said second temperature range.
2. A connector as claimed in claim 1 in which the first temperature range is below the second temperature range.
3. A connector as claimed in claim 1 wherein the clamping sleeve is tubular and wherein said plug portion is cylindrical and is releasably engaged by said clamping sleeve.
4. A connector as claimed in claim 3 in which the socket member further includes a compression sleeve comprising a tubular collar extending around at least part of the length of said tubular clamping sleeve.
5. A connector as claimed in claim ? in which the compression sleeve is made of titanium alloy.
6. A connector as claimed in claim ? in which the titanium alloy comprises substantially 3% Al, 2.5% V and 94.5% Ti.
7. A connector as claimed in claim 1 or 3 provided with means for axially biasing a plug member towards the socket member.
8. A connector as claimed in claim 1 or 3 further comprising means for heating or cooling said clamping sleeve of shape memory effect material through the transformation temperature thereof.
9. A connector as claimed in claim 1 wherein said plug portion is cylindrical and wherein said clamping sleeve is tubular and is capable of releasably engaging said plug portion and a like plug portion at opposite respective ends of said clamping sleeve.
10. A connector as claimed in claim 1, being an optical fibre connector.
11. A connector as claimed in claim 10 wherein the plug member comprises an optical fibre termination ferrule having a cylindrical plug portion.
12. An optical fibre connector as claimed in claim 11 in which the plug portion has a faced end and in which the optical fibre terminates in the plane of the faced end.
13. A connector as claimed in claim 1 in which the shape memory effect material is a shape memory alloy having a martensite transformation temperature lying within a temperature range of approximately 85° C.±50° C.
14. A connector as claimed in claim 13 in which the shape memory effect alloy is a shape memory effect brass.
15. A connector as claimed in claim 14 in which the brass is a ternary alloy chosen according to martensite formation temperature from a range of alloys comprising by weight 3.5 to 10% Al, 9 to 28% Zn, and 65 to 82.5% Cu.
16. A connector as claimed in claim 15 in which the ternary alloy comprises by weight substantially 4% Al, 26% Zn and 70% Cu, and has a martensite transformation temperature of between 50° C. and 70° C.
17. A connector as claimed in claim 1 in which the compression sleeve is made of metal.
18. A method of releasably connecting two optical fibres comprising securing each fibre end in a ferrule and clamping the ferrules together with a thermally releasable clamping sleeve body comprising shape memory effect (SME) material by heating the SME material, abutting two ferrules therewithin and position biasing the ferrules in such abutting position while the SME material is cooled to a clamping state wherein the SME material is in its softer martensitic state and reinforcing such clamping with an outer elastic compression sleeve.
19. An optical connector comprising:
a first cylindrical plug member for retaining an optical fibre positioned therewithin and terminating at the center of an end face of the first plug member;

a second cylindrical plug member also for retaining an optical fibre positioned therewithin and terminating at the center of an end face of the second plug member; and a clamping sleeve including shape memory effect (SME) material which defines a cylindrical socket into which at least a portion of said first and second plug members may be inserted so as to place their said end faces into abutting relationship when the temperature of said SME material is above a predetermined transformation temperature and wherein said end faces are thereafter automatically clamped into a centered abutting disposition as the temperature of the SME material is reduced below said transformation temperature while the end faces are being biased into abutting relationship;

an elastic compression sleeve member surrounding said clamping sleeve, tending to reinforce said clamping action at temperatures below said transformation temperature while expanding to facilitate the expansion of said SME material at temperatures above said transformation temperature.

20. An optical connector comprising:

a first cylindrical plug member for retaining an optical fibre positioned therewithin and terminating at the center of an end face of the first plug member;

a second cylindrical plug member also for retaining an optical fibre positioned therewithin and terminating at the center of an end face of the second plug member; and a clamping sleeve including shape memory effect (SME) material which defines a cylindrical socket into which at least a portion of said first and second plug members may be inserted so as to place their said end faces into abutting relationship when the temperature of said SME material is above a predetermined transformation temperature and wherein said end faces are thereafter automatically clamped into a centered abutting disposition as the temperature of the SME material is reduced below said transformation temperature while the end faces are being biased into abutting relationship;

a housing in which said clamping sleeve and said second plug member are commonly mounted and including position bias means for biasing said second plug member towards said clamping sleeve whereby an optical fibre connection can be conveniently made and unmade with said first plug member by (a) inserting or removing the first plug member while maintaining the temperature of the clamping sleeve above said transformation temperature and (b), in the case of insertion, maintaining an insertion force against said position bias means while lowering the temperature of the clamping sleeve below said transformation temperature.

21. An optical connector as in claim 20 wherein said first and second plug members each include stop means for limiting plug movement into said clamping sleeve.

* * * * *